(12) United States Patent
Kempf et al.

(10) Patent No.: US 11,215,967 B2
(45) Date of Patent: Jan. 4, 2022

(54) PREDICTIVE TROUBLESHOOTING FOR ABNORMAL PLANT OPERATIONS

(71) Applicant: Honeywell International Inc., Morris Plains, NJ (US)

(72) Inventors: Alicia Kempf, Abington, PA (US); David Ross Nixon, Freshwater (AU); Rahul C. Nath, Leura (AU)

(73) Assignee: Honeywell International Inc., Morris Plains, NJ (US)

( * ) Notice: Subject to any disclaimer, the term of this patent is extended or adjusted under 35 U.S.C. 154(b) by 179 days.

(21) Appl. No.: 16/442,408

(22) Filed: Jun. 14, 2019

(65) Prior Publication Data

US 2020/0393810 A1 Dec. 17, 2020

(51) Int. Cl.
 *G05B 19/406* (2006.01)

(52) U.S. Cl.
 CPC .. *G05B 19/406* (2013.01); *G05B 2219/31334* (2013.01)

(58) Field of Classification Search
 CPC ............... G05B 19/406; G05B 2219/31334
 USPC .............................................. 700/108
 See application file for complete search history.

(56) References Cited

U.S. PATENT DOCUMENTS

| | | | |
|---|---|---|---|
| 5,546,301 A | 8/1996 | Agrawal et al. | |
| 6,138,049 A | 10/2000 | McLaughlin | |
| 6,272,386 B1 | 8/2001 | McLaughlin et al. | |
| 7,313,448 B2 | 12/2007 | Dietrich et al. | |
| 7,630,777 B2 | 12/2009 | Rudnick et al. | |
| 9,665,089 B2 | 5/2017 | Schreder et al. | |
| 2006/0020423 A1* | 1/2006 | Sharpe, Jr. | G05B 23/0254 702/183 |
| 2006/0191993 A1* | 8/2006 | Markham | G06Q 10/00 235/376 |
| 2008/0168356 A1* | 7/2008 | Eryurek | G05B 23/0272 715/736 |
| 2008/0238699 A1 | 10/2008 | Byrne et al. | |
| 2010/0083029 A1* | 4/2010 | Erickson | G06F 11/0709 714/2 |
| 2014/0082417 A1* | 3/2014 | Barton | G06F 11/079 714/26 |
| 2015/0081107 A1* | 3/2015 | Graham | G05D 23/1917 700/276 |
| 2015/0348051 A1 | 12/2015 | Bodda et al. | |
| 2018/0096312 A1* | 4/2018 | Lechtenberg | G06Q 10/20 |
| 2018/0174065 A1* | 6/2018 | Debnath | G06F 11/3452 |

(Continued)

FOREIGN PATENT DOCUMENTS

GB 2565875 A 2/2019

OTHER PUBLICATIONS

Duffy, Proactive Chemical Batch Process Monitoring with Golden Batch Technology, Arkema, Inc. 2014.

(Continued)

*Primary Examiner* — Robert A Cassity
(74) *Attorney, Agent, or Firm* — Paschall & Associates, LLC; James C. Paschall (57) ABSTRACT

A system and method are provided for recording and then displaying comments containing recommended actions to take in response to abnormal conditions arising during process operations. The comments can be ranked by an operator based on their success in remedying abnormal conditions with the highest ranked actions displayed first.

16 Claims, 4 Drawing Sheets

(56) References Cited

U.S. PATENT DOCUMENTS

2018/0259923 A1    9/2018   De et al.

OTHER PUBLICATIONS

European search Report for corresponding EP Application No. 20178139.0.
Examination Report for corresponding Australian Application No. 2020203657.

* cited by examiner

PREDICTIVE TROUBLESHOOTING FOR ABNORMAL PLANT OPERATIONS

FIELD OF THE INVENTION

The field of this invention is industrial automation, and in particular a system and process for operation for predictive time-based control of batch or sequential operations in predicting or reacting to an abnormal situation.

BACKGROUND OF THE INVENTION

Many types of industrial processes involve sequential operations during the manufacture or production of products. Common examples are found in food and beverage, specialty chemical and pharmaceutical industries, where discrete steps are typically performed in series on a batch of input materials to create a batch of output product. Sequential operations are also often performed in continuous process industries such as energy production where pieces of equipment are periodically taken through sequences of operations to start, stop, or clean the equipment or to switch between different pieces of equipment.

Recently, there have been developments in providing for rapid two-way communication between operators and other team members, as well providing operating information in the form of sending a message to an operator. In this communication, a message is recorded from a processing unit upon receiving a signal from one or more sensors. The processing unit includes a processor with memory for storing the signal and recording the signal in the memory. The processor includes memory for storing of a program to run the processing unit and includes control information on operational limits for the signal. The processor generates a message when the signal received from the sensor is outside the operational limits for the program. The method includes sending the generated message to an operator station and prompts the operator for a response. The generated message can send a link to a menu of possible preprogrammed responses for the operator to choose from or can allow the operator to input a response. The operator's response is recorded for future reference. The method allows for input of signal data, generated graphs, and additional information that is stored, and available to other operators.

Currently there is no way to automatically predict abnormal situations in a batch process before they occur so they can be prevented or the right people can be ready to react and correct an abnormal situation quickly. The manner that such situations are dealt with and the actions required to troubleshoot and fix abnormal situations in a batch or other type of process is that the situations are recorded by operators on a paper sheet. This data is not available for easy analysis and learning to prevent future abnormal conditions or troubleshoot issues in a batch more quickly thus reducing downtime and batch throughput and ensuring batch quality. Capturing operator comments and their recommended actions for recovery in electronic format ensures data integrity compliance, allows valuable data to be easily accessed and reviewed for process improvements and can be used for data and batch analytics to predict abnormal conditions and recommend corrective actions thus reducing time required to troubleshoot abnormal conditions and reducing training required for inexperienced operators. The same principles can be applied to continuous manufacturing.

SUMMARY OF THE INVENTION

The present invention provides for a rapid two-way communication between operators and other team members, as well providing operating information in the form of sending a message to an operator of an abnormal operational condition. The method records a message from a processing unit upon receiving a signal from one or more sensors. The processing unit includes a processor with memory for storing the signal, and recording the signal in the memory. The processor includes memory for storing of a program to run the processing unit and includes control information on operational limits for the signal. The processor generates a message when the signal received from the sensor is outside the operational limits for the program. There are multiple abnormal conditions that can be detected by the system. A delay can be detected by comparing the current phase cycle time to the cycle time recorded in a reference batch run. At this point the delay has already been detected and shown on a timeline of current operations. Another abnormal condition may be an exceedance. Key performance indicator parameters on the unit and the recipe can be configured by an engineer and monitored at run time with each key performance indicator parameter having a range set in the master recipe. When the parameters exceed that range the system will detect the abnormal condition and display an indication on the unit timeline that may be monitored on a tablet, computer monitor or other output device. Another indicator of an abnormal condition may be an alarm that would be exhibited on the unit timeline. When any of these abnormal conditions is detected, the condition will be visualized to the operator and a new context menu will be made available for a response or comments. When the operator has successfully troubleshooted an abnormal condition and returned operations to normal, a menu is presented where the operator can select a comment from a process graphic, from a phase on the unit timeline or other input screen. Information will be provided by the system that captures the batch identification of the batch that is running as well as other information including the location and asset or unit that is involved in the abnormal condition that occurred. The operator may select an issue category such as delay, exceedance, maintenance, equipment or other issue. The system then may query an event log and return a list of previously entered comments including recommended actions. In addition, the comments may be provided in order of those historically considered top recommended actions with the ability to expand the list and review the full list in order of relevance. The operator may then select a comment from the historical list and/or they may enter their new comment in text by typing or voice entry which may then be converted to text. The system then logs a new type of event, a comment event into the event log maintained on the server. This event log does capture all of the identification information including the batch identification, the location or asset/unit, the particular parameter involved, the issue category, the comment text, the recommended action, operator user name, date and time. The operator may input some "like" or "dislike" remarks which the system can use to increment or decrement the rank of that comment relative to other comments. In the future in exhibiting comments, an algorithm functions to show the most relevant recommended actions based upon a combination of rank, issue category, recipe and location. For example, the top three recommended actions may be exhibited although the system may be modified to show a different number of recommended actions. The generated message can send a link to a menu of possible preprogrammed responses for the operator to choose from or can allow the operator to input a response. The operator's response is recorded for future reference. The method allows for input of signal data, generated graphs, and additional information that is stored, and available to other operators.

In another embodiment, the invention comprises an addition to a distributed control system for recording and transmitting messages to operators and recording and transmitting responses from the operators when a processing unit encounters an abnormal condition. The apparatus includes a sensor that generates a processing signal, indicating a processing condition such as temperature for example. The apparatus further includes a processor that includes memory for storing a control program to operate a processing unit, wherein the processor includes storage for storing the signals and creates a signal record. The control program, also known as a recipe, includes processing limits, and generates a message when the process signal exceeds the limits. The generated message includes information regarding the process, the recipe, and the type of signal generated by the sensor. The apparatus includes a communication device for sending the message to the operator and receiving a comment that constitutes the response from the operator. The communications can include a signal stream of data and output the information in the form of a graph, or other convenient means of displaying the results.

Additional objects, embodiments and details of this invention can be obtained from the following drawing and detailed description of the invention.

DETAILED DESCRIPTION

Communication is important in today's industrial processing plants. There is a need for a rapid transfer of information and a record to draw upon information for similar circumstances in the past to continually provide greater responsiveness in the operation of industrial processes. Currently, industrial plants rely on phone communications, or other electronic communications for disclosing abnormal operational conditions. There is a need for improving these communications and providing for more information. This improvement reduces losses due to lost product or downtime.

The present invention provides for more instant communication, as well as providing more complete information to a controller, or to an operator to provide solutions to situations encountered.

Figure 1:
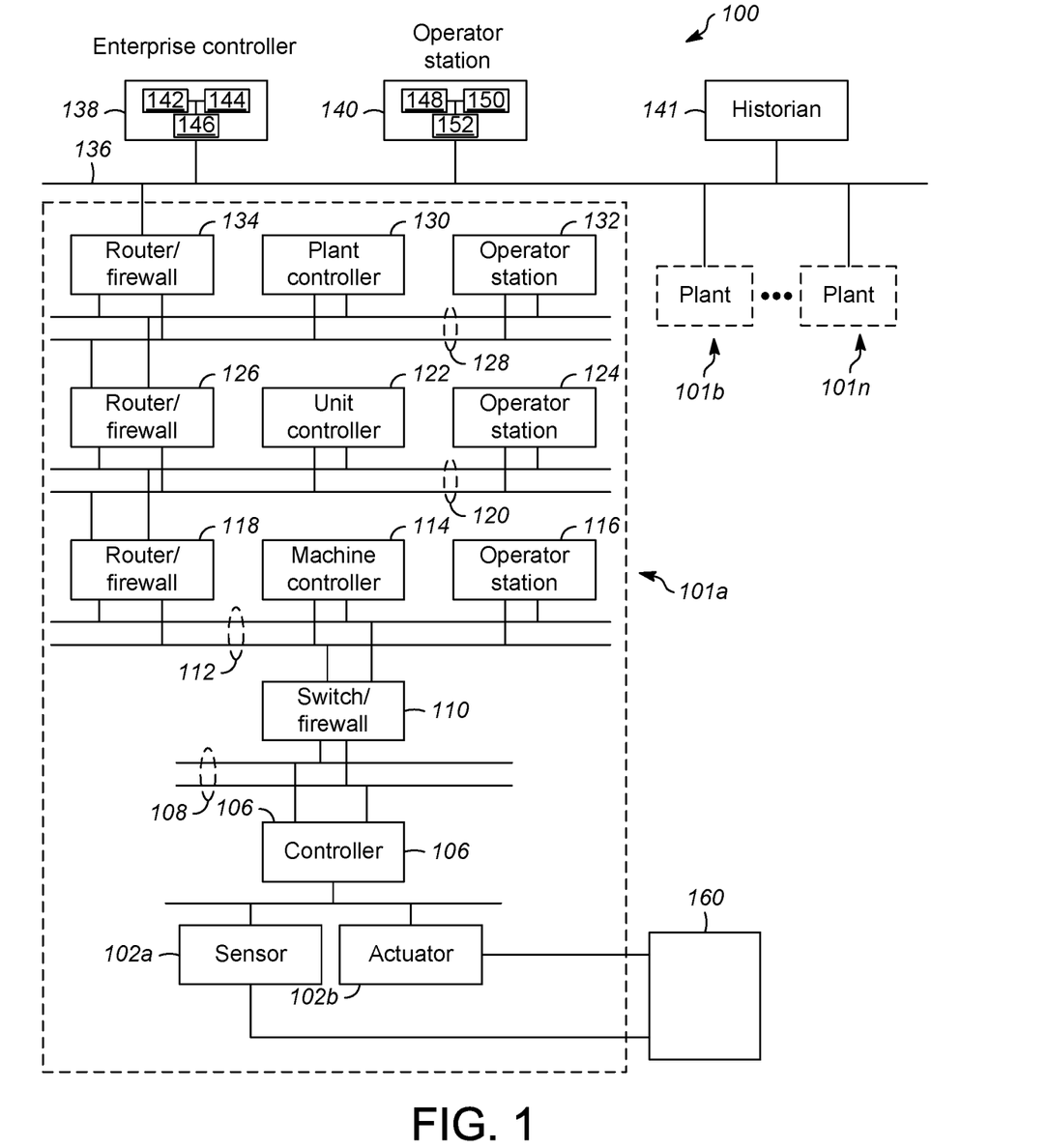
FIG. 1 illustrates an industrial process control and automation system.

FIG. 1 illustrates an example industrial automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could after a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system. The sensors and actuators may be generally referred to as field devices.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, Level "1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Multiple controllers 106 could also operate in redundant configurations, such as when one controller 106 operates as a primary controller while another controller 106 operates as a backup controller (which synchronizes with the primary controller and can take over for the primary controller in the event of a fault with the primary controller). Each controller 106 includes any suitable structure for interacting with one or more sensors 102 a and controlling one or more actuators 102b. Each controller 106 could, for example, represent a multivariable controller, such as a Robust Multivariable Predictive Control Technology (RMPCT) controller or other type of controller implementing mod& predictive, control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers could include one or more processing devices 142 and one or more memories 144 for storing instructions and data used, generated, or collected by the processing device(s) 142. Each of the controllers could also include at least one network interface 146, such as one or more Ethernet interfaces or wireless transceivers. Also, each of the operator stations could include one or more processing devices 148 and one or more memories 150 for storing instructions and data used, generated, or collected by the processing device(s) 148. Each of the operator stations could also include at least one network interface 152, such as one or more Ethernet interfaces or wireless transceivers.

Currently any analysis of past abnormal conditions by using of data to reduce batch cycle time is a manual process requiring additional analytical tools which require manpower to configure and added cost to the system. The disclosure will provide that the system will automatically collect the relevant data from operators when a delay or other abnormality occurs and visualize the part of the batch process and any related equipment that has had past abnormalities and use that data to predict future problems or give operators the guidance to correct the issue without the need for manual troubleshooting which can be time consuming. It will also provide guidance to operators to suggest the most optimal path for a batch based on past data. There is a provision made for the generation of additional events and data that can be used to produce batch analytics which can then be analyzed.

This system and its implementation allows for the operator to be able to prevent potential issues before they cause delays in the processing of the batch or allows them to have the information to troubleshoot issues quickly and get batch production back on track thereby reducing overall batch cycle time.

An important aspect of the invention is the communication between an operator at an operator station 116, and a field service person. The field service person is on site checking the routine operation of process units. The operator, while at the plant, or even at a distant location, is at an operations center monitoring information coming in from the process units. When an abnormal condition arises, the rapid communication between the operator and the field service person is important for reducing downtime and bringing a process back into normal operational conditions.

By capturing operational signals, indicating an abnormal condition, the operator can send a copy of the signal, and supporting information to the field service person, as well as messages, indicating a source of the problem, enabling the field service person to bring the process back to normal operational conditions.

Likewise, a field service person, can transmit photos, or other information to the operator, who can evaluate the information from the field service person, against the messages that have been saved from prior abnormal conditions.

In addition, this invention provides important communication wherein the operator can inform the field service person of an abnormal condition, and can send signal data, or other information. The field service person can check, not only to see if there is a change in the process unit's operation, but check to see if there is a faulty signal due to a failed sensor, or a signal change due to a failed actuator, or other faulty device.

In the present invention, an operating unit includes sensors and actuators, with information flowing from the sensors to a controller, and the controller sends a response to an actuator for the process. The present invention provides for a rapid response when the controller receives an abnormal condition. As presented in FIG. 2, the process 200 is shown. A process 210 is monitored by an operator. The process has sensors that generate signals indicating the operating conditions of the processing unit 160. A processing unit 160 is any operational unit in a plant that produces a product, or an intermediate product, and is monitored by sensors attached to the processing unit 160, and has actuators for modifying the conditions in the processing unit 160. Examples include chemical reactors, separation units, or even a section of an assembly line such as a process that fills bottles or cans. The signals are received by a processor, wherein the signals from the sensor on the processing unit 160 are stored in memory that is included with the processor, or controller 106, associated with the processing unit 160. The processor also includes memory for storing a control recipe for operating the processing unit 160. The control recipe is a program designed for operating the processing unit 160. The control recipe includes operational limits for the signal. When the processor detects an abnormal condition 220, or a signal that is outside the operational limits, the system generates a message 230 indicating the signal is abnormal, or outside the operational limits as specified by the recipe. The generated message can be sent to the display for the operating unit. The message can generate a prompt for the operator to respond to the message. The generated message includes information regarding the process, the control recipe and the type of signal generated by the sensor. The operator then selects a response to the message 240.

Figure 2:
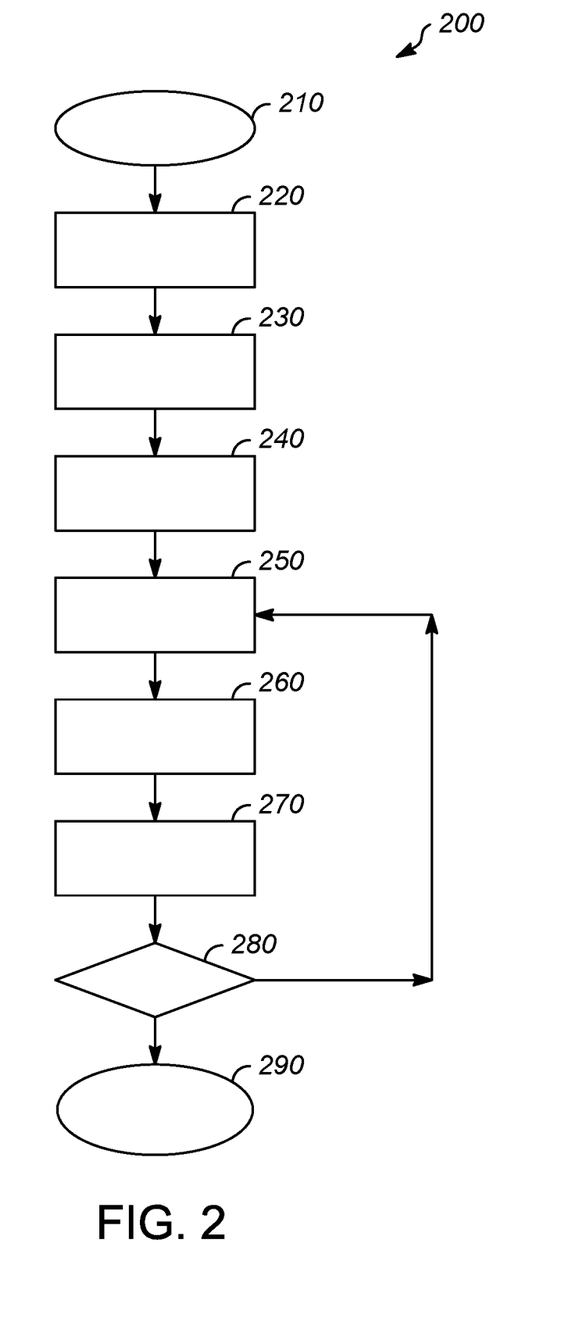
FIG. 2 shows a flow chart of the process.

The message can be a preprogrammed response the operator enters, or selects from a menu, or allows the system to select a default response. The menu presents a list of options 250, based upon the type of processing unit 160 and the sensor 102*a*. The options are ranked by relevance, severity, historical actions, or some combination with appropriate weighting of the abnormal condition to provide guidance to the operator. The menu is generated from past operating conditions for the process, when the process has registered as deviating from the limits set in the process recipe. This provides an operator with a quick listing and of causes of the current abnormal condition. The relevance is based upon severity of the signal, and the frequency with which a similar signal has been received in the past. For example for a heated mixer, the message might be "mixer heat out of limit", or "temperature out of mixer temperature range", or "pressure out of pressure range". The operator can add text, images, process data, emojis and other information to the operator's response message, and then completes the transmission of the message and storage of the message. The interaction includes a link to a control action, which can be a preprogrammed action, or an operator input action.

In selecting a message from the menu, the operator can "like" or "dislike" a message 260, which will update the "like" or "dislike" count for that message. The updating of the "like" or "dislike" count for a message allows for operators to study the frequency of abnormal behaviors and to assess which messages are most likely. The operator then sends the response 270 and performs the recommended action. The system checks to see that the process has returned to normal operating conditions 280. A response time is built into the cycle to allow the process unit to return to normal operating conditions. If the process has not returned to normal operating conditions, the system returns to the list of options 250 and continues allowing the operator to review other relevant options from the menu. Normal operating conditions are when the signal returns to the range prescribed by the recipe. The operator can rapidly communicate to a field service person to check on progress and make recommendations. This system of checking continues until the process returns to normal 290. In the present invention, an operating unit includes sensors and actuators, with information flowing from the sensors to a controller, and the controller sends a response to an actuator for the process. The present invention provides for a rapid response when the controller receives a signal that a process is operating outside of a planned range which is designated as an abnormal condition. As presented in FIG. 2, the process 200 is shown. While an operator is monitoring a process 210, a signal is observed from a sensor on a processing unit. A processor associated with the processing unit includes memory for storing the signal. The processor also includes memory for storing a control recipe for operating the processing unit. The control recipe is a program designed for operating the processing unit. The control recipe includes operational limits for the signal. When the processor detects an abnormal condition 220, or a signal that is outside the operational limits, the system generates a message 230 indicating the signal is abnormal, or outside the operational limits as specified by the recipe. The generated message can be sent to the monitor for the operating unit. The message can generate a prompt for the operator to respond to the message by inputting an operator comment. The message generated by the system includes information regarding the process, the control recipe and the type of signal generated by the sensor. The operator then reviews comments that include possible responses to the message 240 or if there are no relevant comments in the system, the operator may input a new comment.

For example, the Experion System (Honeywell International) has a server display with a timeline and from time to time it may detect an abnormal condition in a batch. There are multiple types of abnormal conditions that the system can detect. One abnormal condition would be a delay that can be detected by comparing the current phase cycle time differing from the cycle time recorded in a reference batch. In prior art systems, the delay is detected and recorded. Another abnormal condition would be an exceedance. Key performance indicator parameters on the unit and the master recipe can be configured by an engineer and monitored at run time. Each key performance indicator has a range and when a sensor detects that a parameter exceeds this range, the system will detect the abnormal condition and display an indication on a current timeline. Another abnormal condition would be an alarm that was exhibited on a display. When any of these abnormal conditions are detected, the condition is exhibited in some way, such as a visual notification, and a new context menu is presented to the operator that provides an opportunity to input or select a comment. The operator may then select a comment that presents a recommended action that is considered likely to resolve the abnormal condition. Then after an operator has successfully troubleshot a batch process, the operator may then select a comment menu from an available system. A display may be then used to capture a batch identification information for the current batch running, the location and/or asset or unit involved and the particular parameter. An operator may select one or more issue categories that are involved in the particular abnormal condition such as delay, exceedance, maintenance issue, equipment issue and others. The system will then query an event log and run an algorithm to rank previously entered comments and return a list of previous comments and the recommended action. The top recommended actions are displayed with an ability to expand the list of possible actions in order of relevance as noted below in the description of FIGS. 3 and 4. The operator may then select a comment from the historical list of comments and/or enter their own comment into the system by an entry means such as a keyboard or a voice message which could be converted to text. When a new comment was entered, the system would log the new comment as a comment event. The information included in this comment event The comment can be a preprogrammed response the operator enters, or selects from a menu, or allows the system to select a default response. The menu presents a list of options 250, based upon the type of processing unit and the sensor. The options can be ranked by relevance, or historical actions. For example for a heated mixer, the message might be "mixer heat out of limit", or "temperature out of mixer temperature range", or "pressure out of pressure range". The operator can add text, images, process data, emojis, and then completes the interaction that may include inputting a comment. The interaction includes a link to a control action, which can be a preprogrammed action, or an operator input action. The interaction may be accomplished by inputting from any input device such as, but not limited to, a computer keyboard, a tablet, a smartphone or an audio input device connected to a computing device.

In selecting a comment from the menu, the operator can "like" or "dislike" a comment 260, which will update the "like" or "dislike" count for the comment or rank the comment in its relative relevance to other comments with regards to the particular abnormal condition. The operator then may perform a recommended action 270 depending upon the judgment of the operator. The system checks an output of a sensor to determine whether the process has returned to normal operating conditions 280. If the process has not returned to these normal operating conditions, the operator continues to review comments and returns to the list of options 250 containing recommended actions and continues, until the process returns to normal operating conditions 290.

In one embodiment, the method includes the processing unit in communication with a central data center and further comprising transmitting the generated message to the central data center. The central data center can be the historian 141, for keeping records of abnormal conditions. The central data center, or historian 141, can be on cloud storage.

In another embodiment, the processor in the processing unit is in communication with a supervisory control center and further includes transmitting the generated message to the supervisory control center. The supervisory control center can be the plant controller 130, or can be the enterprise controller 138. This enables communication of events to other plants, or other processing units within the plant to allow similar problems to be addressed quickly. The supervisory control center can generate a confirmation message to the local operator for the processing unit. This allows operators to know of additional resources. The supervisory control center can also generate a second message and transmits the second message to a supervisory operator, to insure the abnormal operating condition is being addressed.

In another embodiment, the invention comprises an apparatus for recording an abnormal behavior in a process, and generating a message about the abnormal behavior. The apparatus includes a sensor 122 on a processing unit that generates a signal. The apparatus includes a processor, or controller 106, which includes memory for storing a control recipe, wherein the control recipe is associated with running a process for producing a product, and wherein the processor includes memory for storing the signals received from the sensor, creating a signal record. The product can be an intermediate product for use in a final product. The control recipe includes processing limits, and generates a process message when the process exceeds the limits, and wherein the process message includes information regarding the process, the control recipe and the type of signal generated by the sensor. The apparatus further includes a means for inputting a response message to the process message. The response message can be an automated response selected from a menu of potential responses for returning the process unit to a normal operating condition. The apparatus further includes a human interface component. The human interface component can be a mobile device, or can be a computer terminal located at the operator station 116.

In one embodiment, the apparatus includes a central database, or central library, wherein the signal record is transmitted and stored in the central database. The central database can be a database local to the plant, or can be the historian 141 for recording process information.

In another embodiment, the apparatus includes a means for inputting photos, comment text, graphs, and process data. The process data can be collected and graphed at the operator station 132. The operator station 132 can include scanners and monitors with keyboards for inputting comment text, or microphones with software for converting speech to text.

In another embodiment, the apparatus includes a search function located in memory on the processor. The search function can recover stored messages from either a local data center, or the historian 141, for stored messages that have the same information regarding the process, the control recipe and the type of signal generated by the sensor. The search function can include operator input to alter the parameters of the search for stored messages.

In yet another embodiment, the apparatus can further be a part of a distributed control system, wherein the distributed control system includes a supervisory control center, or plant controller 130, or enterprise controller 138. The supervisory control center is in communication with the operator station 124 and the processor, or unit controller 122, and is in communication with the central data center, or historian 141. This provides for oversight control and distribution of messages to similar processing units.

Figure 3:
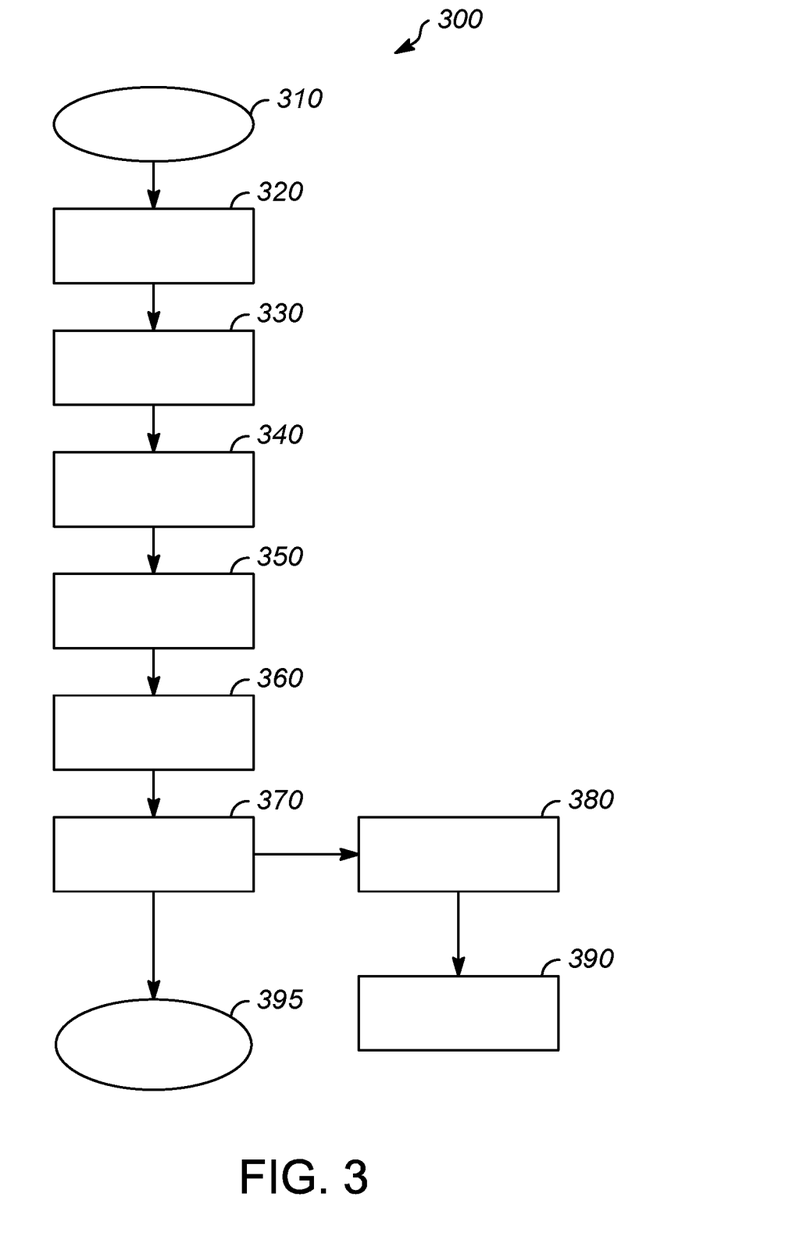
FIG. 3 shows an order of steps taken where an abnormal condition arises in a batch operation.
Figure 4:
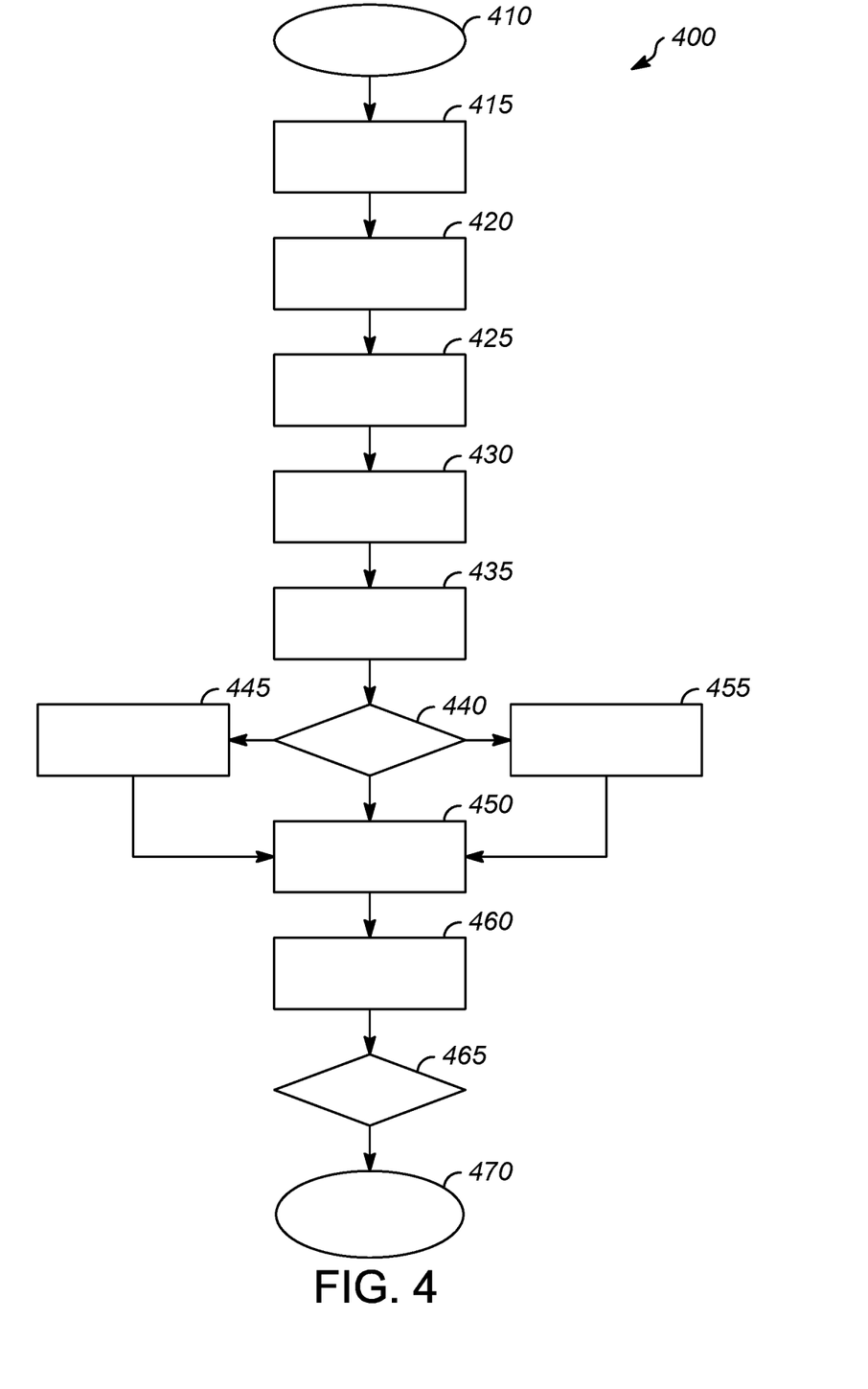
FIG. 4 shows the steps that can be taken when there is a delay in batch cycle time.

FIGS. 3 through 4, discussed below and the various embodiments used to describe the principles of the present invention in this patent document are by way of illustration only and should not be construed in any way to limit the scope of the invention. Those skilled in the art will understand that the principles of the invention may be implemented in any type of suitably arranged device or system. As noted above, many types of industrial processes involve sequential operations, such as during the manufacture or production of products or in continuous process industries. There are a wide variety of automation levels and degrees of human operator involvement in these types of batch or sequential processes. In some cases, sequences of operations are defined outside of a process control system and are performed manually, which could be done according to a documented list of instructions. In other cases, sequences of operations are implemented within a process control system, but periodic interactions with human operators are needed, such as to answer questions or confirm that physical actions have been completed by personnel at various stages. In still other cases, sequences of operations are completely automated. Human operators may only need to know about the sequences to perform various tasks, like starting the sequences, maintaining situation awareness, or responding to unforeseen or problematic situations.

For all of these various levels of automation, operators and other personnel involved in the sequences of operations often need to coordinate their daily tasks and oversight responsibilities with these sequential operations in mind. The times at which questions need to be answered, manual tasks need to be performed, specific equipment needs to be available, or critical process phases need to occur can be important. Any operator delays or distractions at certain times could result in lower plant throughput, equipment damage, or lost product. This challenge is compounded as the scope of responsibility for an operator increases, since the operator has more sequences running in different pieces of equipment with independent demands and timeframes. As a result, the scope of responsibility that an operator can handle without delay and without error is limited because time-based information that the operator needs is nonexistent, fragmented, inaccurate, or expensive to engineer.

Conventional approaches often provide little or no useful information about when an operator will need to perform tasks or focus on particular pieces of equipment to support sequences of operations. For example, an operator may only have access to a sequential function chart, which in some cases can be defined according to a standard (such as the ANSI/ISA-88 standard). A sequential function chart is a flowchart that conveys the order of steps in a sequence but not the timing of those steps. In other cases, an application or customized display may attempt to visualize countdowns against "engineered" timing expectations for parts of a sequence. However, this requires additional effort to build and maintain, and it does not incorporate real-world variances that occur, such as those that occur due to changed product formulas or seasonal and equipment variations. An operator could load a historical trend of process data values for a particular "golden" batch of product and use that to estimate the timeline of a current process. However, the selected batch might not be similar to the current sequence and using process trends for multiple batches can show too much data to clearly highlight upcoming operations in the current sequence and when they will occur. This visual overload problem is also true (or exacerbated) by simply displaying past and current trend data overlaid or beside each other. In addition, existing visualizations of sequences often give only fragmented views of what an operator is responsible for, and they typically focus on one sequence or unit of equipment at a time with only hints at when important events will occur.

Currently any analysis of past abnormal conditions and using that data to reduce batch cycle time is a manual process requiring additional analytic tools which require manpower to configure and added cost to the system. The system will automatically collect the relevant data from operators when a delay or other abnormality occurs and visualize the part of the batch process and any related equipment that has had past abnormalities and use that data to predict future problems or give operators the guidance to correct the issue without the need for manual troubleshooting which can be time consuming. It will also provide guidance to operators to suggest the most optimal path for a batch based on past data.

This disclosure describes techniques for predictive time-based control of batch or sequential operations. In particular, this disclosure deals with a system and method of operation for an operator to quickly identify solutions and take recommended action in response to abnormal conditions that may arise during batch or sequential operations. Being able to prevent potential issues before they cause delays in the batch or have the information to troubleshoot quickly and get the Batch back on track reduces overall batch cycle time. This results in increased throughput and ensures batch quality by eliminating abnormal situations that can impact quality or result in loss of material. Also, by providing operators data learned by past operators the system automatically provides knowledge transfer between experienced operators and new operators reducing training time and making shift changes more efficient.

In the process of the present invention, there is a server, such as an Experion Server sold by Honeywell Incorporated. The server display, the Unit Timeline, detects an abnormal condition in a batch. There are multiple abnormal conditions the system can detect. A delay can be detected by comparing the current phase cycle time is greater than the cycle time recorded in the reference batch. The delay is currently already detected and shown on the unit timeline unit now card. Another abnormal condition would be an exceedance. Key Performance Indicator parameters on the Unit and the Recipe can be configured by an engineer and monitored at run time, each KPI has a range, when the parameters exceed the range the system will detect the abnormal condition and display an indication on the unit timeline now card (see FIG. 1: Unit Timeline KPIs). A third abnormal condition would be an alarm, alarms are displayed on the unit timeline. When any of these abnormal conditions is detected the condition will be visualized on the unit timeline and a new context menu will be available for "Comment". When an operator has successfully troubleshooted a batch and it is returned to a normal state the Operator can select "Comment" from a point.param on a Process Graphic, from a Phase on the unit timeline or the Procedure Explorer. The system will present a display (see FIG. 2 operator Comment Dialog) which captures the batch ID of the Batch running, the Location or Asset/Unit and the point.parameter. Operator can select an Issue Category (Delay, Exceedance, Maintenance, Equipment, etc.). The system will query the Experion Server Event Log and run an algorithm which will rank previously entered comments and return a list of previous comments and the recommended action and display the top recommended actions with the ability to expand and see the full list in order of relevance (see flow charts attached for "Operator Logs Comment", "High Level Abnormal Condition Detected Recommended actions presented", and "Algorithm to rank comments"). Operator can select a comment from the historical list and/or they can enter their own text into the dialog by typing or voice entry which would convert voice to text. The system would log a new type of event, Comment Event, in the existing Experion Server Event Log DB. The event would capture Batch ID, the Location or Asset/Unit, the point.parameter, Issue Category, comment text, recommended action, operator user name, date and time and rank. Operators can "Like" or "Dislike" a comment and the system will increment or decrements the rank. Selecting a historical comment for the current comment would increment the rank. The algorithm to show most relevant recommended actions would use a combination of rank, issue category, the recipe tag name and location to determine overall relevance and the top 3 recommended actions would be displayed to the user with the option to view all.

FIG. 3 show an order of steps 300 taken starting at the top where an abnormal condition arises in a batch operation 310. Then within the context of the operation of an Experion system, but applicable to other systems in principle, an operator selects a point parameter from the appropriate screen 320, such as a unit timeline, procedure explorer or process graphic and selects a context menu for "Comment". The system presents an operator comment dialog box 330 and the operator then selects a category of abnormal condition 340 or the issue presented such as delay, exceedance, maintenance need or equipment issue. The operator may then enter comments 350 through voice or text and then can enter recommended actions 360. The system then logs an event 370 in the event log which can include batch identification, unit information, point parameter, issue category, comment text and recommended actions 380 which then is recorded in the server 390. The display is then returned to its normal functioning 395 when there is no abnormal condition occurring.

FIG. 4 shows the steps 400 that an operator can take when there is a delay in batch cycle time in comparison to a reference batch time proceeding from the top to the bottom. An operator is monitoring the batch that is being processed 410. The system then detects an abnormal condition 415. The system presents an indication of an abnormal condition 420 to the operator who then selects a menu 425 exhibiting comments. The list of recommended actions and historical comments 430 are shown to be ranked by relevance. The operator is able to indicate 440 that the comment is "liked" 445 or "disliked" 455. If the comment is "liked" 445 then a counter is increased while if it is "disliked" 455 the counter is decreased. After this point, the system then updates 450 the relative ranking of this comment with respect to other comments that have been saved previously. During this process, the operator implements the recommended actions 460 as necessary and the batch processing is returned to normal processing 465 conditions in most cases and the operator can then return to monitoring the batch processing 470. If operation has not returned to normal processing conditions, the entire process is repeated 430 with a review of the previously highly ranked comments and implementation of recommended actions.

SPECIFIC EMBODIMENTS

While the following is described in conjunction with specific embodiments, it will be understood that this description is intended to illustrate and not limit the scope of the preceding description and the appended claims.

A first embodiment of the invention is an apparatus, comprising a sensor that generates a signal; a processor, including memory for storing a control recipe, wherein the control recipe is associated with running a process for producing a product, and wherein the processor includes memory for storing the signals received from the sensor, creating a signal record; wherein the control recipe includes processing limits comprising a normal range of operation and abnormal conditions comprising an abnormal range of operation outside of the normal range of operation, and generates a process message when the sensor detects the abnormal condition, wherein the process message includes information regarding the process, the control recipe and the type of signal generated by the sensor; a means for an operator to select or input a comment in response to a response message; and a means for maintaining a collection of the comments. An embodiment of the invention is one, any or all of prior embodiments in this paragraph up through the first embodiment in this paragraph wherein the abnormal conditions are at least one of a delay, an exceedance, a maintenance issue or an equipment issue. An embodiment of the invention is one, any or all of prior embodiments in this paragraph up through the first embodiment in this paragraph wherein the means for maintaining a collection of the comments includes a means for ranking the comments. An embodiment of the invention is one, any or all of prior embodiments in this paragraph up through the first embodiment in this paragraph wherein the means for maintaining a collection of the comments includes a means for maintaining information related to the abnormal condition and a batch being processed when the abnormal condition occurred. An embodiment of the invention is one, any or all of prior embodiments in this paragraph up through the first embodiment in this paragraph wherein the means for ranking the comments is in communication with a means to display a list of top recommended actions to resolve the abnormal condition. An embodiment of the invention is one, any or all of prior embodiments in this paragraph up through the first embodiment in this paragraph further comprising a human interface component for viewing, inputting and interacting with the comment. An embodiment of the invention is one, any or all of prior embodiments in this paragraph up through the first embodiment in this paragraph wherein the human interface component is a mobile device or a computer. An embodiment of the invention is one, any or all of prior embodiments in this paragraph up through the first embodiment in this paragraph further comprising integrating the apparatus into a distributed control system wherein the distributed control system includes a supervisory control center and a central data center with communication between the processor and the data center, and with communication between the processor and the supervisory control center.

A second embodiment of the invention is a method for managing comments in a processing unit comprising monitoring multiple planned sequences of operations involving industrial equipment, the planned sequences of operations comprising at least one of one or more sequences of operations currently being performed using the industrial equipment and one or more sequences of operations to be performed using the industrial equipment wherein the operations are performed in accordance with a recipe containing key performance indicators; detecting a deviation in the key performance indicators wherein the deviation is determined to be an abnormal condition; identifying comments recorded in a processing unit wherein the comments are associated with prior identified deviations and wherein the comments contain a list of recommended actions to be taken to remedy the abnormal condition; determining whether any of the list of recommended actions are considered by an operator likely to remedy the abnormal condition; implementing one or more of the recommended actions; and inputting a ranking of the comment based on the success of the recommended action in remedying the abnormal condition. An embodiment of the invention is one, any or all of prior embodiments in this paragraph up through the second embodiment in this paragraph wherein the abnormal condition is selected from a delay, an exceedance or a shortfall in an operation, or a requirement for maintenance of equipment. An embodiment of the invention is one, any or all of prior embodiments in this paragraph up through the second embodiment in this paragraph further comprising adding additional information to the comments after the determination of whether the sequence of operations has returned to normal operating conditions. An embodiment of the invention is one, any or all of prior embodiments in this paragraph up through the second embodiment in this paragraph further comprising adding an additional comment after observing the abnormal condition and performing an action to return the operations to normal operating conditions. An embodiment of the invention is one, any or all of prior embodiments in this paragraph up through the second embodiment in this paragraph wherein an operator monitoring the multiple planned sequences of operations after observing the abnormal operating condition first selects a point parameter from a process operating system to select a comment context menu, selects a category within the abnormal condition is determined to be most relevant and then the operator inputs a comment regarding the abnormal condition into an operator comment dialog screen. An embodiment of the invention is one, any or all of prior embodiments in this paragraph up through the second embodiment in this paragraph wherein the operator inputs the comment including one or more recommended actions to be made in response to the abnormal condition. An embodiment of the invention is one, any or all of prior embodiments in this paragraph up through the second embodiment in this paragraph wherein information related to the comment, the abnormal conditions and the recommended actions are recorded as a comment event. An embodiment of the invention is one, any or all of prior embodiments in this paragraph up through the second embodiment in this paragraph wherein the comments are listed in an order based upon the rankings of the comments.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. An apparatus to provide recommended actions for abnormal condition in sequences of operations involving industrial equipment, the apparatus comprising:
    an operator station monitored by an operator;
    a sensor that generates a signal;
    a processor, including memory for storing a control recipe, wherein the control recipe is associated with running the sequence of operations for producing a product involving the industrial equipment, and wherein the processor includes memory for storing the signals received from the sensor, creating a signal record;
    wherein the control recipe includes processing limits comprising a normal range of operation and abnormal conditions comprising an abnormal range of operation outside of said normal range of operation, and generates a process message we said sensor detects said abnormal condition, wherein the process message includes information regarding the process, the control recipe and the type of signal generated by the sensor, the process message transmitted to the operator station;
    a menu displayed at the operator station to the operator to select or input a comment in response to the process message; and
    the menu maintaining a collection of said comments, containing a list of the recommended actions to be taken to remedy said abnormal condition; and
    the operator entering a ranking of said comments in the menu based on the recommended actions from the list of recommended actions in remedying said abnormal condition,
    wherein inputting the ranking comprises:
        incrementing or decrementing the ranking of said comments based on the operator inputs, and
        implementing at least one of the recommended actions.

2. The apparatus of claim 1 wherein the abnormal conditions are at least one of a delay, an exceedance, a maintenance issue or an equipment issue.

3. The apparatus of claim 1 wherein the menu maintains a collection of said comments that includes a ranking of said comments.

4. The apparatus of claim 1 wherein the menu collection of said comments includes maintaining information related to said abnormal condition and a batch being processed when said abnormal condition occurred.

5. The apparatus of claim 3 wherein said ranking of said comments is displayed to the operator as a list of top recommended actions to resolve said abnormal condition.

6. The apparatus of claim 1 further comprising a human interface component for viewing, inputting and interacting with said comment.

7. The apparatus of claim 6 wherein the human interface component is a mobile device or a computer.

8. The apparatus of claim 1 further comprising integrating the apparatus into a distributed control system wherein the distributed control system includes a supervisory control center and a central data center with communication between the processor and the data center, and with communication between the processor and the supervisory control center.

9. A method for providing recommended actions for an abnormal condition in sequence of operations involving industrial equipment and managing comments in an operator station by an operator of a processing unit comprising:
    monitoring multiple planned sequences of operations involving the industrial equipment, the planned sequences of operations comprising at least one of: one or more sequences of operations currently being performed using the industrial equipment and one or more sequences of operations to be performed using the industrial equipment wherein the operations are performed in accordance with a recipe containing key performance indicators;
    detecting a deviation in said key performance indicators wherein said deviation is determined to be an abnormal condition and sending a deviation message to the operator station;
    identifying comments recorded in the operator station of the processing unit to the operator in response to the deviation message, wherein said comments are associated with prior identified deviations and wherein said comments contain a list of recommended actions to be taken by the operator to remedy said abnormal condition;
    determining whether any of said list of recommended actions are considered by the operator to remedy said abnormal condition;
    implementing one or more of said recommended actions; and
    inputting by the operator a ranking of said comments based on said recommended actions from the list of recommended actions in remedying said abnormal condition, wherein inputting the ranking comprises incrementing or decrementing the ranking of said comments based on the operator inputs.

10. The method of claim 9 wherein said abnormal condition is selected from a delay, an exceedance or a shortfall in an operation, or a requirement for maintenance of equipment.

11. The method of claim 9 further comprising adding additional information to said comments after said determination of whether said sequence of operations has returned to normal operating conditions.

12. The method of claim 9 further comprising adding an additional comment after observing said abnormal condition and performing an action to return said operations to normal operating conditions.

13. The method of claim 9 wherein an operator monitoring said multiple planned sequences of operations after observing said abnormal operating condition first selects a point parameter from a process operating system to select a comment context menu, selects a category within said abnormal condition is determined to be most relevant and then said operator inputs a comment regarding said abnormal condition into an operator comment dialog screen.

14. The method of claim 13 wherein said operator inputs said comment including one or more recommended actions to be made in response to said abnormal condition.

15. The method of claim 13 wherein information related to said comment, said abnormal conditions and said recommended actions are recorded as a comment event.

16. The method of claim 9 wherein said comments are listed in an order based upon said rankings of said comments.

\* \* \* \* \*